United States Patent [19]

Scholle

[11] 4,041,209

[45] Aug. 9, 1977

[54] MULTIPLE WALL PACKAGING MATERIAL CONTAINING SULFITE COMPOUND

[75] Inventor: William R. Scholle, Compton, Calif.

[73] Assignee: Scholle Corporation, Northlake, Ill.

[21] Appl. No.: 745,238

[22] Filed: Nov. 26, 1976

Related U.S. Application Data

[63] Continuation-in-part of Ser. No. 544,587, Jan. 27, 1975, abandoned.

[51] Int. Cl.$^2$ .................. B65D 81/28; B32B 27/32; B32B 21/06
[52] U.S. Cl. .................. 428/500; 206/484; 426/124; 426/127; 426/131; 426/133; 426/323; 426/324; 426/415; 428/35; 428/510; 428/518; 428/522; 428/537; 428/539; 428/913
[58] Field of Search ............ 426/133, 323, 124, 415, 426/127, 131, 324; 428/518, 913, 35, 539, 510, 537, 522, 411; 206/484

[56] References Cited

U.S. PATENT DOCUMENTS

| 1,584,903 | 5/1926 | Supplee | 426/323 |
| 2,979,410 | 4/1961 | Parlour | 426/133 |
| 3,052,553 | 9/1962 | McKillip | 426/133 |
| 3,429,717 | 2/1969 | Cook | 428/910 |
| 3,852,489 | 12/1974 | Yip | 426/323 |

FOREIGN PATENT DOCUMENTS

569,215  1/1959  Canada .................. 426/133

OTHER PUBLICATIONS

E. R. Sherwin, "Antioxidants for Food Fats and Oils," *J. of the Amer. Oil Chemists Soc.*, vol. 49, (No. 8), pp. 468–472 (1972).

*Primary Examiner*—Ellis Robinson
*Attorney, Agent, or Firm*—Gary, Juettner & Pyle

[57] ABSTRACT

A structural multiple ply wall for a product container has an inner container sheet ply having a composition providing low product permeability through the ply for a product disposed adjacent to a first face of the ply. A fluid coating consisting of an aqueous solution of a reducing sulfite salt is disposed adjacent to the second face of the inner sheet ply, the coating actively reacting with oxygen gas from the adjacent atmosphere. At least one sheet exterior ply has one face of one of the exterior ply disposed adjacent to the fluid coating. The exterior ply can have a composition providing low oxygen permeability through the sheet exterior ply. The inner sheet ply, the liquid coating, and the sheet exterior ply are contiguously integrally disposed together forming the structural multiple ply wall. The wall is formed into a product container providing at least the major proportion of the container wall area. A method of manufacturing the multiple ply wall is taught.

3 Claims, No Drawings

MULTIPLE WALL PACKAGING MATERIAL CONTAINING SULFITE COMPOUND

CROSS REFERENCE TO RELATED APPLICATION

The application is related to the pending U.S. application, Ser. No. 363,376, filed May 24, 1973 now abandoned by the same inventor and is a continuation-in-part of copending application Ser. No. 544,587, filed Jan. 27, 1975, now abandoned by the same inventor.

BACKGROUND OF THE INVENTION

It has become increasingly prevalent to package food and other products in non-metallic containers, such as containers and pouches made from thermoplastic material. One problem which arises with the usage of these materials is that many non-metallic materials, such as paper or thin films of polymeric materials, including polyethylene, are sufficiently permeable or porous to allow diffusion of atmospheric oxygen from the exterior of the container or package into the interior of the container.

In the packaging of many food products and other commercial products which are sensitive to or reactive with oxygen, it would be desirable to provide an inexpensive structural material which would effectively decrease the penetration of oxygen through the container wall. The contamination of food products as well as other commercial products with oxygen after packaging has many undesirable effects, including discoloration, deterioration, and spoilage of the product, resulting in significant loss in acceptable commercial shelf storage life.

It is well known in the plastics art and the commercial process of packaging products to incorporate minor concentrations of certain antioxidants into the polymer before polymerization, extrusion or other formation thereof, as well as to coat plastic and paper films with subsequent film layers which contain antioxidants. Such antioxidants tend to prevent oxidation of, and change of properties in, the polymer itself but do not actively react with oxygen.

C. W. Desaulniers, in U.S. Pat. No. 3,499,820, issued Mar. 10, 1970, discloses a self-supporting laminate of polymeric films, including a first film of polymer, and a second film bonded to the first film and containing a filler of clay-like mineral having plate-like shapes. A third film of polymer is disposed adjacent to the second filler film. The self supporting laminate provides low permeability to gases, specifically oxygen, by mechanically interposing a plate-like mineral barrier film.

C. C. Kirk, T. E. Ferington, and R. S. Gregorian, In U.S. Pat. No. 3,539,437, issued Nov. 10, 1970, disclose a self-supporting laminate film having a first sheet of flexible thermoplastic film, a second sheet of mineral filler selected from minerals consisting of vermiculite, mica, talc, and clay bonded to the first film. At least one additional film of a polymer is disposed on the second film. The bonded multiple ply laminate provides a mechanically impermeable mineral barrier plate-like structure reducing the permeability of gases through the laminate structure.

Schindler, in Austrian Pat. No. 212,209 issued Dec. 12, 1960, discloses a multiple ply laminate having a hydrophilic carrier layer, a layer adjacent to the hydrophilic carrier layer, which is impermeable to water vapor, to fatty substances, and to light and consists of a thermoplastic coating containing pigments of powdered metal and titanium dioxide. A third layer consisting of chlorinated rubber and a synthetic resin is bonded to the second layer, and a fourth layer of synthetic thermoplastic material provides a hardness greater than any of the other layers.

A Russian Pat. No. 238,774, issued July 15, 1969, discloses an inert powder between a pair of parent materials, followed by a thermal welding step. The powders are silicon dioxide, metal oxides and the like.

The Cook U.S. Pat. No. 3,429,717 discloses a multiple-ply film structure containing an organic antioxidant and solvent between two adjacent plies. The types of antioxidants disclosed, such as propyl gallate, however, do not react directly with oxygen and would not serve to chemically react with oxygen being transmitted between the plies.

The Parlour U.S. Pat. No. 2,979,410 and Canadian Pat. No. 569,215 disclose the concept of providing an edible antioxidant coating on the surface of the film that is wrapped over the food product, whereby the surface of the food becomes coated with the antioxidant to prevent deterioration. Certain oxygen reactive and edible compounds, however, such as ascorbic acid, tend to discolor upon being oxidized, thereby imparting ab undesirable color to the packaging or the food. In accordance with the Supplee U.S. Pat. No. 1,584,903, an oxygen reactive agent such as ferrous sulphate or stannous chloride is provided on an isolated interior wall of a container so as to absorb free oxygen present in the container.

SUMMARY OF THE INVENTION

A structural multiple ply wall for a product container has an inner container sheet ply whose composition provides low product permeability through the ply for a product disposed adjacent to a first face of the inner sheet ply. A fluid coating consisting of an aqueous solution of an oxygen reactive sulfite compound actively removes atmospheric oxygen which diffuses adjacent to the coating. The liquid or solution is disposed adjacent to the second face of the inner sheet ply. At least one sheet exterior ply has one face of one of the exterior ply disposed adjacent to the fluid coating. The exterior ply can have a composition providing low oxygen permeability through the exterior ply. One or more exterior ply may be suitable adjacently disposed. The inner ply, the fluid coating, and the exterior ply are contiguously integrally disposed together, forming the structural multiple ply wall. The wall is suitable for providing at least a major proportion of a container wall area, excluding the sealed sheet ply joints. The inner sheet ply can typically be a wax impregnated cellulose sheet composition, polyethylene, or other sheet ply polymers such as polypropylene and the like.

The fluid is selected from the group consisting of aqueous solutions of water soluble salts of sulfite ion ($SO_3^{--}$), bisulfite ion ($HSO_3^-$), meta bisulfite ion ($S_2O_5^{--}$) and hydrosulfite ion ($S_2O_4^{--}$) and mixtures thereof. The sulfite solution can interface with the oxygen gas diffusing through the sheet exterior ply and the inner sheet ply, and can chemically react with the atmospheric oxygen. Thus, the oxygen gas is prevented from diffusing through the inner sheet ply into a product disposed adjacent to a first face of the inner sheet ply. In addition, the sulfite solution does not discolor upon being oxidized and may evolve sulfur dioxide gas that may diffuse through the inner ply and kill or prevent growth of pathogenic organisms in food products.

Included in the objects of this invention are:

To provide a structural multiple ply wall for a product container embodying an oxygen reactive composition.

To provide a multiple ply wall for a product container having properties suitable for usage in a product container for food.

To provide a multiple ply wall for a product container complying with the regulations for non-toxic product containers for food.

To provide a low cost structural multiple ply wall suitable for forming product containers from a continuous commercial mill material roll, or the like.

Other objects and advantages of this invention are taught in the following description and claims.

DESCRIPTION OF THE PREFERRED EMBODIMENT

A structural multiple ply wall for a product container has an inner container sheet ply whose composition provides a low product permeability through the ply for a product disposed adjacent to a first face of the inner sheet ply. An oxygen reactive sulfite composition is provided which actively reacts with atmospheric oxygen diffusing adjacent to the coating. The sulfite composition is disposed adjacent to the second face of the inner sheet ply. At least one sheet exterior ply has one face of one of the exterior ply disposed adjacent to the oxygen reactive sulfite composition. The at least one sheet exterior ply can have a chemical composition providing low oxygen permeability through the at least one sheet exterior ply. The inner ply, the sulfite composition, and the at least one sheet exterior ply are contiguously integrally disposed together forming the structural multiple ply wall. The wall is suitable for providing at least the major portion of the container wall area, excluding the sealed sheet ply joints. The wall can be manufactured in continuous wide width web rolls for commercial applications. The continuous web rolls can then be fabricated into container products as are required.

The inner container sheet ply can be sheets of nonmetalic materials that are employed in packaging and include cellulosic materials such as paper, fiberboard, waxed paper and fiberboard, and polymeric materials wherein the sheet ply can be selected from the group of polyethylene, polypropylene, polyisopropylethylene, polyisobutylethylene, polyvinylidene chloride, polyvinyl chloride, polystyrene, polyethylene terephthalate, polyethylene-2, 6-naphthalate, polyhexamethylene adipamide, polymers of butene, vinyl acetate, methyl acrylate, 2-ethyl hexyl acrylate, isoprene, butadiene acrylamide, and ethyl acrylate N-methyl-n-vinyl acetamide, and combinations thereof. The specific inner sheet ply composition is selected to provide a low product permeability through the ply for a specific product which is to be disposed adjacent to a first face of the inner sheet ply. The list of polymers is intended to be exemplary only since many others are known and can be employed in the practice of this invention.

The sulfite composition serves to chemically combine with oxygen and thus serves to remove atmospheric oxygen which may diffuse through the wall. The sulfite composition is preferably in the form of an aqueous solution, although solvents can be utilized in addition to water. The sulfite composition contains a substance selected from the group consisting of water soluble salts or acids of sulfite ions ($SO_3^{--}$), bisulfite ion ($HSO_3^-$), meta bisulfite ion ($S_2O_5^{--}$), hydrosulfite ion ($S_2O_4^{--}$), and mixtures thereof. The sulfite composition functions to remove oxygen gas which may diffuse through the exterior ply and the inner ply of the structural wall. The amount and component concentration of the sulfite composition are the values required to lower the oxygen diffusion through the structural wall to the desired value. The solution is preferably buffered to an acid pH or otherwise acidified to increase reactivity.

The at least one sheet exterior ply has one face of one exterior ply disposed adjacent to the sulfite composition. The composition of the exterior ply can be selected to provide as low oxygen permeability as is required for the product container application. Polyvinylidene chloride can be selected for the one or more exterior ply in the multiple ply wall, since it is well known to have a low oxygen permeability. Other polymeric compositions can be selected, as are required. The individual sheet ply of the multiple ply wall may be identical or dissimilar, being provided with sealing means. In selecting the combination of inner sheet ply and exterior ply, consideration must be given to the problem of providing chemically compatible and physically sealable sheet ply chemical compositions which provide a multiple ply wall having suitable commercial storage life. The problems of sealing multiple ply together to form a wall suitable for container construction are well known in the packaging art and are to be solved in known manner.

In addition to the function of removing atmospheric oxygen which may diffuse through the wall, the use of sulfites offer additional advantages in this environment in comparison with other oxygen reactive antioxidants. Although ascorbic acid conventionally serves as an antioxidant in foods, for example, an oxidized solution thereof would tend to discolor and turn brown, thus adversely affecting the appearance of the container. The sulfite solutions, however, remain clear and colorless upon oxidation and do not form byproducts that may be harmful to food.

In addition, sulfite compounds tend to decompose to produce sulfur dioxide gas. The evolved gas, in turn, serves to destroy many types of harmful or pathogenic organisms associated with food products, such as bacteria and fungi. In fact, many food products and containers are surface treated with sulfur dioxide gas to insure sanitation of the product. In the case of the present invention, any gas which may diffuse through the inner ply of the container will contain a significant amount of sulfur dioxide gas as well as nonreactive gases such as nitrogen, which will aid in the preservation of the product and minimize surface discoloration that otherwise would occur because of oxidation.

As one example of the invention, the outer ply may comprise polyvinylide chloride which is preferably coated on its inside sealing surface with a polymer to insure a good heat seal, such as polyolefin or ethylene vinyl acetate copolymer. The inner ply could consist of polyethylene or ethylene vinyl acetate. Since the outer ply is relatively non-porous in comparison to the inner ply, any sulfur dioxide gas generated by the sulfite composition would tend to migrate toward and through the inner ply and into at least surface contact with the contained product, while any oxygen penetrating the outer ply would be eliminated.

The multiple ply wall of the present invention is advantageously used in the packaging of food products which are sensitive to or reactive with oxygen. The removal of oxygen tending to pass through the wall from the exterior serves, for example, to greatly reduce surface discoloration of solid or semisolid foods, while the sulfur dioxide gas evolved from the sulfite compounds acts as a preservative.

The composite material of the present invention may be fabricated into the form of containers, bags, pouches and the like, the food product may be inserted or poured therein, and the container may be sealed to provide an air tight enclosure. Such containers are particularly useful in packaging liquids, such as wine, semi-solids, such as tomato paste or catsup.

The following is an example of a suitable sulfite composition for use in connection with the present invention:

EXAMPLE I

| | |
|---|---:|
| Water | 100.00 grams |
| Sodium bisulfite | 30.00 grams |
| Citric acid (buffered to pH = 3.3) | 1.50 grams |

The above example utilizes sodium bisulfite, embodied in a formulation of distilled water and citric acid as a buffer. The listed inorganic sulfite, bisulfite and other salts may be likewise utilized. The concentration of these compounds are those which are required to produce the desired rate of removal of diffusing oxygen.

Thickeners other than carboxymethyl cellulose may be utilized, including pectin, sodium alginate, and the like. The thickeners must of course be chemically compatible and stable in the desired sulfite compositions.

The structural multiple ply wall of this invention especially facilitates convenience packaging of food products, which by law or other regulation cannot contain or be exposed to specified antioxidants and the like chemicals in amounts in excess of specified levels. In particular, a package can be fabricated fully compatible with the packaged food, having an outer ply providing resistance to oxygen penetration and an adjacent fluid oxygen scavenger coating providing for the removal of atmospheric oxygen which diffuses through the sheet exterior ply. In this manner, protection from oxidation can be provided for the packaged food without subjecting the food itself to antioxidant materials.

Many modifications and variations in the improvement in the multiple ply wall can be made in the light of my teaching. It is therefore understood that within the scope of the appended claims, the invention may be practiced otherwise than has specifically been described.

I claim:

1. A structural multiple ply wall for a product container, said wall comprising:
    an inner container sheet ply selected from the group consisting of cellulosic and polymeric materials having a composition providing low product permeability through said ply for a product disposed adjacent to a first face of said ply;
    a fluid coating having an oxygen scavenger composition actively providing removal of oxygen from a gaseous atmosphere contacting said fluid coating, said fluid coating disposed adjacent to the second face of said inner sheet ply, said oxygen scavenger composition having disposed therein at least one compound comprising water soluble salts of sulfite ion ($SO_3^{--}$), bisulfite ion ($HSO_3^{-}$), meta bisulfite ion ($S_2O_5^{--}$), hydrosulfite ion ($S_2O_4^{--}$); and
    at least one sheet exterior ply consisting of polymeric material having one face of one said exterior ply disposed adjacent to said fluid coating;
    said inner ply, said fluid coating, and said at least one sheet exterior ply being contiguously integrally disposed together, forming said structural multiple ply wall, said wall being suitable for providing at least the major proportion of the container wall area.

2. The wall of claim 1 wherein said at least one sheet exterior ply comprises polyvinylidene chloride.

3. The wall of claim 1 wherein said inner sheet ply comprises polyethylene.

* * * * *